Jan. 22, 1957 G. G. LANDIS ET AL 2,778,910
APPARATUS FOR SUBMERGED ARC WELDING
Filed Nov. 12, 1952 4 Sheets-Sheet 4

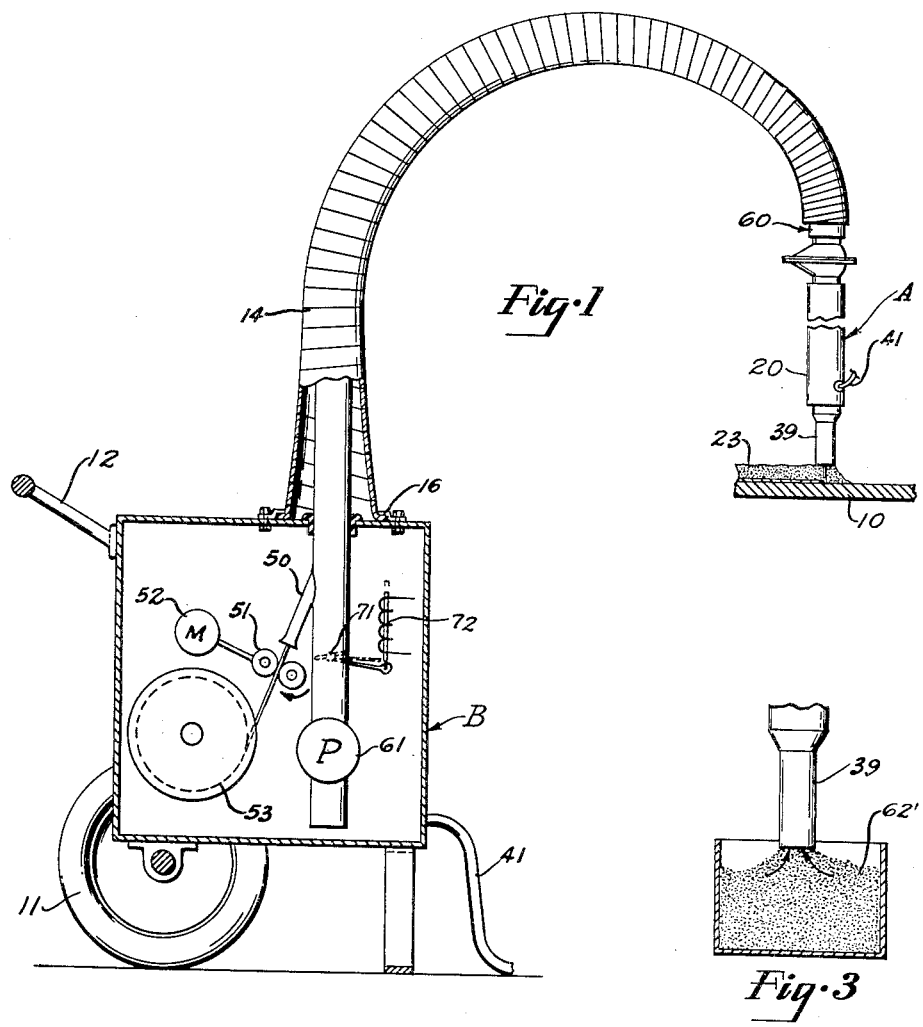
Fig. 1
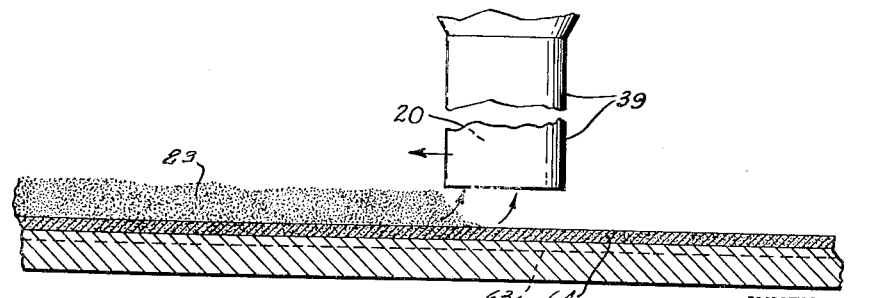
Fig. 3
Fig. 4
INVENTORS,
GEORGE G. LANDIS
HAROLD S. PAYNE

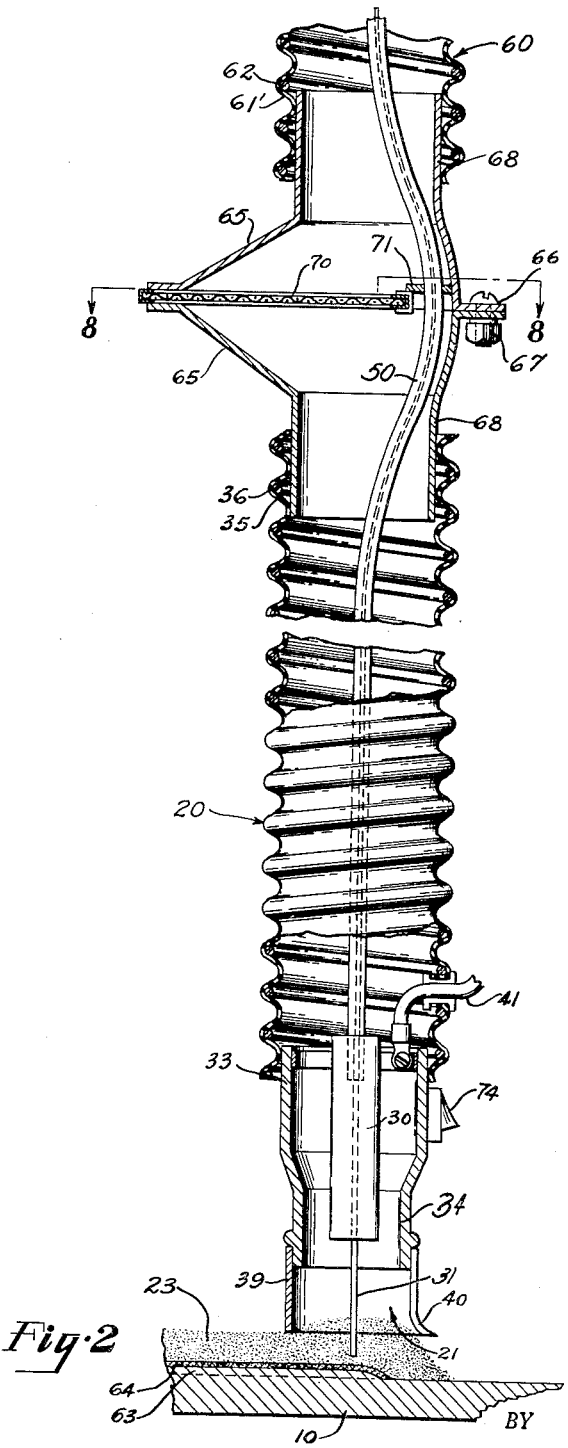

INVENTORS,
GEORGE G. LANDIS
HAROLD S. PAYNE
BY
Alfred E. Body

United States Patent Office 2,778,910
Patented Jan. 22, 1957

2,778,910
APPARATUS FOR SUBMERGED ARC WELDING

George G. Landis, South Euclid, and Harold S. Payne, Cleveland Heights, Ohio, assignors to The Lincoln Electric Company, Cleveland, Ohio, a corporation of Ohio Application November 12, 1952, Serial No. 319,906

1 Claim. (Cl. 219—130)

This invention pertains to the art of arc welding and, more particularly, to method and apparatus for submerged arc welding wherein a layer of granular flux is deposited along a seam to be welded and an arc is maintained below the flux to effect the weld.

The invention is particularly applicable to arc-welding apparatus wherein a portable welding head is employed such as that described in the copending application of Harold S. Payne and George G. Landis, Serial No. 319,907, filed November 12, 1952, and will be described with particular reference thereto, although it will be appreciated that the invention has broader applications.

In the art of submerged arc welding, one of the problems has been to obtain a sufficient supply of the granular flux along the weld seam to enable long, continuous weld seams to be made. This problem is particularly true where the welding head must be portable such as where irregular welds must be made or where fully automatic welding apparatus is not practicable. With a portable welding head, the size of the flux hopper is necessarily limited because of the weight and bulk problems where the welding head must be manually held. This small size of the hopper restricts the amount of flux which may be stored in the welding head and, thus, limits the length of a weld seam before the hopper must be refilled. Refilling the hopper is ordinarily a somewhat time-consuming and tedious problem and results in actual non-productive time for the welding operator and, thus, a somewhat inefficient end operation.

Means have been proposed for continuously advancing welding flux to the weld head either by means of mechanical equipment such as a wormscrew or by means of compressed air or the like, both of which push the flux over from a flux-supply source to the welding head. With both of these, there is always the problem of the flux jamming somewhere in the passages between the flux source and the welding head, resulting in inferior welds because of interferences in the flux supply. With the wormscrew, which is mechanical, the problem of maintenance and wear due to the abrasive action of the flux is always present. Furthermore, the wormscrew is both bulky and heavy. With the use of compressed air for pushing the flux to the welding head, the problem of condensation of moisture from the condensed air, both in the flux and in the vicinity of the weld, always presents a problem. For perfect welds with submerged arc welding to be obtained, it is absolutely necessary that there be a minimum amount of moisture present.

Another problem has been the control of the flow of flux from the flux hopper or otherwise to the weld area. Valve mechanism has been proposed to be placed in the flux-discharge opening of the flux hopper but, again, because of the abrasive nature of the flux, the valve mechanism is subject to severe wear, sticking and generally unsatisfactory operation.

In the art of submerged arc welding using a granular flux, it is necessary that an amount of flux be deposited along the weld seam in excess of that which will be beneficially used during the welding process. Thus, the electrodes project downwardly through the flux to form a pool of molten metal on top of which a layer of molten flux forms. Over all of this is a layer of unfused, granular flux which has been unaffected by the welding operation and actually can be reused. However, because of the difficulty of returning this unused flux to the hopper or to the flux source, it is oftentimes wasted. With continuous, high-speed welding operations, the amount of granular flux wasted in the course of the day can be considerable and the cost thereof a determining factor in whether arc welding or some other form of welding or fastening of the metal parts together shall be employed.

The present invention contemplates new and improved welding apparatus including a flux hopper which is easily and quickly filled to its capacity, which has an ample flux capacity and, yet, is not bulky nor unduly heavy, which does not have need for mechanical mechanism or valve mechanism in the presence of the abrasive flux material, which is not bothered by condensation due to the expansion of compressed air in the vicinity of the weld operation and which enables the excess flux remaining after a welding operation to be easily and quickly picked up either immediately after the weld operation or concurrently therewith.

In accordance with the present invention, a flux hopper is provided having a flux-discharge opening at the lower end in combination with means for selectively and at will causing a flow of air through an opening into the hopper of a velocity sufficient to carry with its a supply of granular flux material positioned adjacent the opening. This opening may be the flux-discharge opening; in which case, the flux hopper may be quickly filled by positioning the flux-discharge opening in a source of flux material until the hopper is substantially filled or the flux-discharge opening may be suitably filled or closed and an auxiliary opening may be provided such as in the general plane of the discharge opening but spaced from the opening and behind the weld area so that the excess or unused flux in a welding operation may be continuously picked up and returned to the flux hopper during the course of a welding operation.

In preferred embodiments of the invention, vacuum sources or vacuum pumps communicate with the upper portions of the flux hopper remote from the flux-discharge opening to cause the air flow inwardly through the appropriate opening to suck or carry the flux into the flux hopper. The opening has a cross-sectional area in relation to the volumetric capacity of the vacuum pump such that there will be a sufficient velocity of air in the opening to perform this function. At least some of the flux in the hopper will always be maintained in a constant state of agitation. Any flux which might tend to drop through the opening will, of course, be immediately sucked back into the hopper by the constant air stream. When the flow of air through the opening is stopped, the flux can then fall through the flux-discharge opening by force of gravity.

The invention has for a principal object new and improved arc-welding apparatus which is extremely simple in construction and operation, which does not have mechanical apparatus operating in the presence of the granular flux, which has a full flux capacity but is not bulky or heavy and which enables flux to be easily picked up either from a source of flux material or from the excess flux remaining after a welding operation.

Another object of the invention is the provision of a new and improved welding apparatus including a flux hopper having a flux-discharge opening at the lower end and means for causing a flow of high-velocity air through said opening to suck flux into the flux hopper or to retain flux already in the flux hopper.

Still another object of the invention is the provision of new and improved arc-welding apparatus including, in combination, a flux hopper having a flux-discharge opening at the lower end thereof and communicating at its upper end with a vacuum source, together with means for selectively communicating the vacuum source with the hopper so as to control the flow of air inwardly to the hopper through the flux-discharge opening.

The invention may be comprised in certain parts and arrangement of parts and certain steps and combinations of steps, preferred embodiments of which will be described in detail in this specification and illustrated in the accompanying drawings which form a part hereof, and wherein:

Figure 1 is a side elevational view partly in section and somewhat schematic of welding apparatus constructed in accordance with the present invention and adapted to carry out the methods of the invention;

Figure 2 is a side elevational view partly in section and greatly enlarged of the welding head shown in Figure 1;

Figure 3 is a fragmentary view of the flux-discharge opening of the welding head of Figure 1 shown positioned in a source of raw or loose granular flux material so that the flux hopper of the welding head may be filled;

Figure 4 is a side elevational view of the welding head of Figure 1 shown picking up excess or unused flux after a welding operation has been completed;

Figure 5:
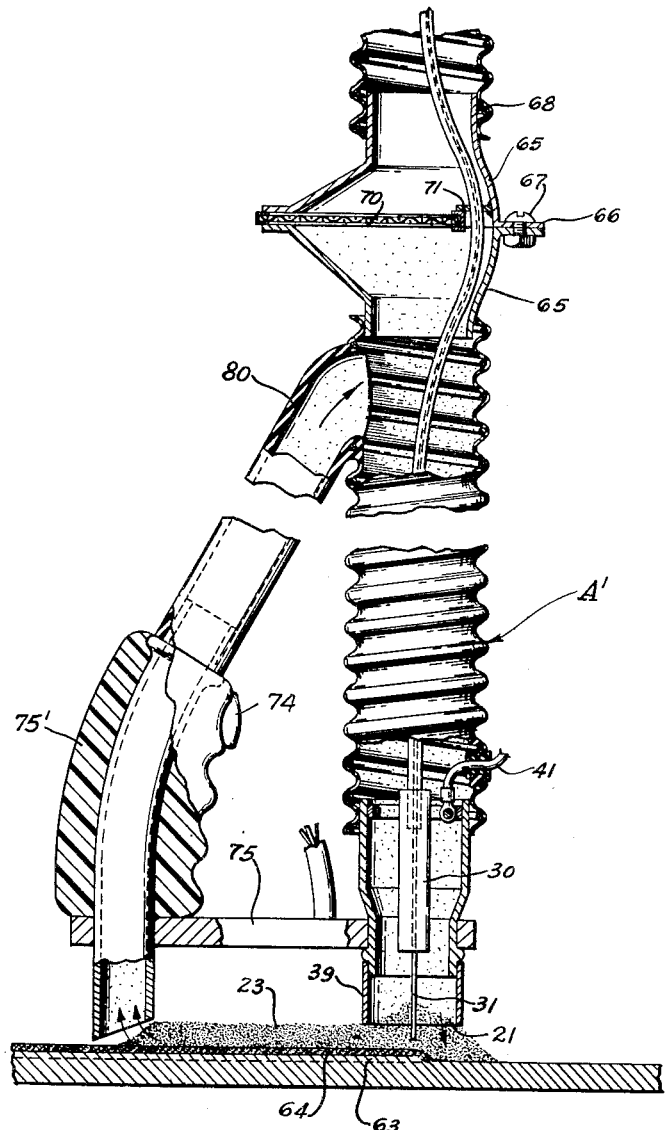
Figure 5 is a side elevational view partly in section of a welding head showing a modified embodiment of the invention.

Referring now to the drawings wherein the showings are for the purposes of illustrating the invention only and not for the purposes of limiting the invention to the specific construction shown, Figure 1 shows a portable welding head A in operative relationship with a workpiece 10 operatively connected through flexible cables with a remotely located base unit B.

The base unit B is generally in the form of a dolly having a pair of wheels 11 and a handle 12 so that the dolly can be moved readily from place to place, the dolly being provided with a pair of legs on the side opposite from the wheels 11 and the handle 12 which rests on the ground or floor when the base unit has been finally positioned.

The base unit B also includes supporting means from which the welding head A is suspended in the form of a resilient or flexible mast-like member 14 mounted at its base end on the upper surface of the dolly and extending vertically upwardly therefrom but flexing to a generally horizontal position under the weight of the welding head A. The mast 14 in the embodiment shown is comprised of a long tapered helical multiturn coil spring fixed to the upper surface of the dolly by any suitable means such as the clamp brackets 16 shown. The particular details of this mast member form no part of the present invention and, therefore, its construction will not be more specifically described herein. For a more specific description of the mast, reference is made to our copending application, Serial No. 319,907, filed November 12, 1952, wherein such a mast is both described and claimed.

The welding head A may take a number of different forms but, in the embodiment shown, includes an elongated flux hopper 20 having a flux-discharge passage 21 at the lower end thereof. The flux hopper 20 is adapted to hold a substantial supply of granular flux 22 which, in the course of the welding operation, falls by gravity out of the flux-discharge opening 21 to form a pile 23 of granular flux on the workpiece 10 along the seam to be welded.

The welding head A also includes an electrode nozzle 30 positioned generally concentrically in the flux hopper 20 and generally in the flux-discharge passage 21. The electrode nozzle has a longitudinal passage therein through which an electrode wire 31 is adapted to be moved continuously toward the workpiece 10 during a welding operation. Obviously, more than one electrode may be used.

The flux hopper 20 is generally comprised of a long flexible tube, including a cloth or fabric tube 35, having a wire helix 36 interiorly thereof serving as a spreader and stiffener for the fabric. The lower end of this fabric tube 35, together with the wire helix, fits over the upper end of a rigid fiber tube 33 which forms a flux-discharge nozzle for the flux hopper 20, the lower end 34 of this tube 33 being reduced in diameter to form the flux-discharge opening of restricted diameter or cross-sectional area relative to the cross-sectional area of the flux hopper 20. A metal tube 39 telescopes over the lower end of the fiber tube 33 and forms an extension thereof.

The electrode nozzle 30 is preferably formed of a copper block having longitudinal passages through which the electrode 31 passes. This electrode nozzle 30 is electrically energized from a source of welding current through a long flexible electrically insulated copper cable 41 which connects to the electrode nozzle interiorly of the flux hopper 20 and extends through an opening in the tube 35 across the floor to the base unit B. The size of the electrode wires 31 is preferably relatively small, being on the order of $3/32$ of an inch and the electrical energy supplied to these electrodes is preferably such that the current density in the electrodes 31 will be on the order of 50,000 amperes per square inch or more. With such an arrangement, the electrode wires 31, as they advance toward the workpiece and make electrical contact therewith, fuse almost instantaneously to cause an arc to be struck and the welding may then be performed on a continuous basis with additional lengths of electrode 31 being advanced toward the workpiece as fast as the electrode burns or melts off. Such high-current density welding is clearly described in our Patent No. 2,444,834 owned by the assignee of this application and will not be described further herein.

The electrode wire 31 is fed to the electrode nozzle 30 through long flexible conduits 50 which extend upwardly through the flux hopper 20 to the base unit B and electrode feed rolls 51 on the base unit B driven by an electric motor 52 feed the electrode wire 31 from an electrode reel 53 pivotally supported in the base unit B into the end of the flexible conduit 50.

One of the problems with welding heads of the type just described is that of filling the hopper with flux and of controlling the flow of flux outwardly through the discharge opening. The present invention, as stated, contemplates providing improved means and apparatus for both filling the flux hopper and controlling the flow of flux outwardly therefrom onto the workpiece or seam to be welded. In accordance with the present invention, this is done by providing a controlled flow of air inwardly through the flux-discharge opening 21 which enables granular flux to be sucked into the flux hopper 20 or, after the flux hopper 20 is filled, prevents any flux from falling out through the flux-discharge opening until the flow of air is stopped.

Various means may be provided for causing this flow of air inwardly through the flux-discharge opening. However, in accordance with the preferred embodiment of the invention, the upper end of the flux hopper 20 communicates through a long flexible hose 60 with a vacuum pump 61 located in the base unit B. The hose 60 may have any desired construction but, in accordance with the preferred embodiment, has a construction similar to the flux hopper 20, namely, an outer cloth tube 61' having an internal spreader and stiffener in the form of a long helical wire spring 62.

With such an arrangement, it will be seen that if the vacuum pump 61 has sufficient capacity and the diameter of the hose 60 in relation to its length is sufficiently large, it is possible to create a sufficient velocity of air through the flux-discharge opening 21 to pick up any granular flux which may be brought into the vicinity of the opening 21. Such flux may, obviously, be flux in a bulk supply of flux or may be excess flux left after a welding operation has been completed. Also, any flux which might be in the hopper 20, as it would tend to fall out through the flux-discharge opening 21 by force of gravity, would be quickly sucked back into the flux hopper 20. In actual operation, it has been found that the flow of air upwardly through the flux hopper 20 is sufficient to maintain the flux in the hopper in a continuous state of agitation so that there is little danger of flux falling outwardly through the opening 21 as long as the air flow is maintained. However, it will be noted that the flux-discharge opening 21 is of a reduced diameter and that the electrode nozzle 30 is concentrically positioned therein, the effect of which will be to greatly increase the air velocity about the electrode nozzle 30 which will tend to further prevent any flux dropping out of the hopper 20 as long as the air flow is maintained.

One of the problems present with the use of such air to either fill the flux hopper 20 or to maintain the flux therein was that of the air at high velocity carrying flux from the flux hopper through the hose 60 over to the vacuum pump 61. In order to prevent this happening, means are provided at the upper end of the flux hopper 20 to prevent any flux passing into the hose 60. Air filters of various types were tried but it was found that the pores or openings in such filters very quickly filled up with the granular flux material. Accordingly, in accordance with the preferred embodiment of the invention, means are provided for so changing the characteristics of the air flow that the flux will be dropped from the air stream and cannot be carried into the hose 60. In accordance with the preferred embodiment, this effect is accomplished by so reducing the velocity of the air and leaves the flux hopper 20 as it enters the hose 60 that the air can no longer carry with it the granular flux and this granular flux then drops back into the flux hopper by force of gravity. Basically, this is accomplished by increasing the cross-sectional area of the path through which the air must flow to such a value that the velocity of the air is substantially slowed down for a distance sufficient to permit the air to drop the entrained flux and allow it to fall back into the hopper. In the embodiment shown, a section of enlarged diameter is provided between the hose 60 and the hopper 20. This section is comprised of a pair of generally funnel-shaped members 65 arranged in back-to-back relationship and having parallel flanges 66 which are held in tight-sealing engagement by means of bolts 67 or the like. Each funnel-shaped member 65 also has a cylindrical extension 68 which extends into the upper end of the flux hopper 20 and the flux hopper end of the hose 60, as the case may be.

Thus, as the air flowing rapidly upwardly through the flux hopper 20 moves into the section of enlarged diameter, its velocity will be momentarily slowed a sufficient amount to drop whatever grains of flux which may be entrained therein and the internal diameter of this section is so adjusted in relation to the size of the particles of the flux 22 and the capacity of the pump 61 that this result will take place.

Granular flux, as conventionally employed in welding, tends to disintegrate or be somewhat pulverized during manufacture or rought handling, thus producing small flux fines which are lighter than the usual flux grains. Such fines would require a greater reduction in air velocity passing through the enlarged section than would the larger, standard grains of flux. To prevent an excessive amount of such fines passing through the hose 60 to the vacuum pump 61, a filter screen 70 is slidably and removably mounted between the members 65 and extends across the enlarged diameter to stop any such flux fines. A baffle member 71 overlaps one edge of the screen and an opening is provided therein through which the flexible conduit 50 for the electrode wires 31 can pass from the flux hopper into the hose 60. Such flexible conduit extends interiorly of such hose 60 to the base unit B where it passes through the walls of the hose 60 to a point adjacent the electrode drive rolls 51.

Obviously, other means for preventing the flux granules from being carried by the air stream to the vacuum pump may be employed, including, without limitation, means which cause the air to be swirled to separate the flux granules by centrifugal action, means for physically diverting the flux particles from the air stream or the like. The arrangement shown, however, has proven extremely practicable in practice.

Means are provided in the base unit B for starting and stopping or otherwise controlling the flow of air through the flux-discharge opening 21. Such means, in the embodiment shown, comprise a butterfly valve 71 positioned in the end of the hose 60 adjacent to the pump 61, which butterfly valve is controlled by an electrically operated solenoid 72. The actuation of this solenoid is controlled by means of a switch 74 rigidly fixed to the welding head A. Obviously, other means, either automatic or manually operated, can be provided for energizing the solenoid 72 to control the position of the butterfly valve 71. Also, other means can be provided for controlling the flow of air through the flux-discharge opening 21 such as turning the vacuum pump source on or off, or otherwise. In the preferred embodiment, however, it is preferred that the vacuum pump run at all times and that the air flow be controlled by the butterfly valve 71. In this manner, almost instantaneous control over the flow of air can be obtained.

With the arrangement shown, very effective means are provided for filling the flux hopper 20. Thus, and referring now to Figure 3, if the lower end of the welding head A, and particularly the lower end of the sleeve 39, is positioned on top of a source of granular flux 62' in bulk, such as is shown in Figure 3, and air is caused to flow inwardly through the flux-discharge opening 21 at high velocity, flux will be very rapidly sucked from the bulk source of flux into the flux hopper, thus causing the hopper to very quickly fill. When the hopper has completely filled, it is only necessary to remove the welding head from the container while allowing the flow of air to continue, move the welding head A to the desired position on the workpiece 10 where the weld is to be effected and, then, stop the flow of air through the opening 21, in which event, the flux which is in the flux hopper and has been maintained generally in a state of agitation by the air flow therethrough will settle down in the flux hopper 20 and will commence to flow outwardly through the flux-discharge opening 21 to deposit the pile of flux 23 on the workpiece 10. Immediately after the flux has commenced to flow through the flux-discharge opening 21, the electrically energized electrodes 31 may be advanced towards the workpiece to strike an electric arc therebetween and effect a welding operation.

In such welding operations, it is normally conventional to deposit more flux upon the weld seam than will actually be employed in the welding operation. In such welding operation, the flux adjacent to the weld seam becomes molten and as the weld metal 63 hardens, the molten flux hardens in a thin layer 64 on top of the hardened weld metal. On top of this hardened flux then is a layer of loose granular flux 23 which has been unaffected by the welding operation. The present invention enables such loose unused flux to be very quickly and easily returned to the flux hopper. Thus, as soon as a weld seam has been completed, the welding operator opens the butterfly valve 71, which immediately causes a flow of air inwardly through the flux-discharge opening 21. This stops the further flow of flux outwardly through this opening and the welding operator may then, by returning the flux-discharge opening along the path of the weld, pick up the loose unused flux 23 and return it to the flux hopper ready for the next welding operation.

It will thus be seen that full and complete control over the flow of flux out of the flux hopper 20 is obtained and that no valves or other mechanism which come into direct contact with the granular flux material are required. In addition, a welding head has been provided which for a minimum weight and minimum bulk can hold a substantial and maximum amount of granular flux so that continuous seam welds of maximum length can be readily effected.

It will be obvious that for best results, the flux particles making up the total flux should be of as nearly a uniform size as possible in order that the velocity of the air stream will react equally on all of such particles. It will be appreciated that with different size particles, different air velocities may be required, which different air velocities can be obtained by a number of different expedients such as adjusting the degree of full opening of the butterfly valve 71, by providing an auxiliary valve in the pipe 60, by controlling the capacity of the pump 61 such as by controlling its speed, by providing various diameter flux hoppers 20 or by adjusting the diameter of the flux-discharge opening 21. It is preferred, however, that the capacity of the pump 61 and the internal diameter of the flux hopper 20 be so proportioned in relation to the flux particle size that the flux will remain suspended or in a state of agitation in the flux hopper due to the velocity of the air passing therethrough while not tending to pass upwardly through the enlarged section provided at the upper end of the flux hopper 20 to reduce the air velocity. Such relative adjustments are well within the skill of the art and will not be further detailed herein.

The invention also permits of the continuous picking up of the unused welding flux at the same time the welding operation is continuing. Thus, in Figure 5, a welding head A' is shown constructed in substantially the same way as the welding head of the preferred embodiment but having means associated therewith, including a passage communicating with the upper end of the flux hopper 20 and an area in the plane of but spaced from the flux-discharge opening 21 such that a flow of air entering this passage will pick up the unused flux and return it to the flux hopper 20. In the embodiment of the invention shown, a tube 80 communicates at its upper end with the upper end of the flux hopper 20, that is, at a point just below the enlarged cross-sectional area. This tube 80 extends downwardly from the flux hopper 20 and in diverging relationship therewith through a passage in a bracket 75 mounted on the lower end of the welding head A' to a point directly below the handle 75' so that its lower opening is generally in the plane of the flux-discharge opening of the sleeve 39. As shown, the lower edge of the tube 80 is slightly beveled so that the edge remote from the flux-discharge opening 21 will be closer to the surface of the workpiece. The tube 80 may be flexible or rigid and the bracket 75 may be made adjustable so as to position the lower end of the tube relative to the workpiece 10.

In operation, let it be assumed that the flux hopper 20 is filled with flux at least up to the lower level of the tube 80 where it communicates with the interior of the flux hopper 20. As the welding head A' is advanced along the surface of the workpiece, a continuous pile of flux 23 is deposited onto the workpiece. The electrodes 31 advance through the pile of flux to engage the surface of the workpiece and cause an arc to be struck. As the welding head A' advances along the surfaces of the workpiece, a molten pool of metal 63 is formed on the top of which is a molten pool of flux 64, all of this under a layer of unused granular flux 23. After the welding head A' passes, the molten metal quickly solidifies and, shortly thereafter, the molten flux solidifies, still leaving an excess of unused granular flux 23 on top thereof. During this welding operation, the butterfly valve 71 is left open, thus causing a flow of high-velocity air into the upper end of the flux hopper 20 through the tube 80. The lower end of the tube 80 is closely adjacent to the pile of unused flux 23 and the flow of air through the tube 80 caused by the vacuum pump 61 picks up this unused flux, and carries it through the tube 80 to the flux hopper where it is redeposited therein and is available for reuse. It will be appreciated that with such an operation, a much smaller flux hopper will be necessary to enable the same length of weld without stopping to refill the flux hopper.

When it is desired to fill the flux hopper 20 if it should become empty, it is only necessary to place both the lower end of the tube 80 and the flux-discharge opening 21 into a source of bulk flux, and open the butterfly valve 71 to cause a flow of air inwardly through both the tube 80 and the discharge opening 21. After the flux hopper 20 becomes filled, the operator may then cover over the lower opening of the tube 80 with his hand, move the welding head A' to the work and open the lower end of the tube 80, in which event, the flux in the hopper 20 which would have been in a state of agitation would then fall down in the hopper and block the flux-discharge opening 21.

If desired, baffle means may be positioned interiorly of the flux hopper operatively associated with the flux-hopper end of the tube 80 so as to deflect flux granules entering the flux hopper through the tube 80 downwardly toward the flux already in the flux hopper 20.

Obviously, if desired, some form of valve could be provided interiorly of the tube 80 to cause the same effect as the positioning of a hand over the open end of the tube 80 or to render inoperative this automatic pickup of the unused flux 23.

In the embodiment of the invention, there is only one wire electrode 31 shown. Obviously, more than one electrode could be used oriented as desired to control the width of the weld seam.

The filter screen 70 positioned between the two funnel-like members 65 is shown as removably mounted in position. In use, it has been found that the passages between the meshes of this screen will, in time, plug or clog up. Generally, this clogging may be cleared by sharp blows on the assembly. To manually clean the screen 70, it may be slid into and out of the assembly.

The welding head A' of Figure 5 is shown as having a handle 75' through which the tube 80 extends equipped with a switch 74 whereby the operator can readily control the operation of the welding apparatus.

Such a handle and switch may also be employed with the structure of Figure 4. If a switch is used, it is preferred that it be of the type which, upon partial depression, actuates one set of switches and, upon further depression, actuates a second set of switches. Thus, in operation, when the switch 74 is partly depressed, the butterfly valve 71 is actuated to the closed position. The flux then flows downwardly through the discharge opening 21 onto the surface of the workpiece 10. Further depression of the switch 74 then energizes the electrode drive motor 52, causing the electrode wire 31 to be advanced toward the workpiece 10 at a predetermined rate. When these wires strike the surface of the workpiece 10, an arc is struck and the welding operation commences and continues until the welding head A is removed from the workpiece 10, thus breaking the electric arc and stopping the weld or until some other operation is performed by the welding operator. As is explained in the copending application of George G. Landis and Harold S. Payne, Serial No. 342,192, filed March 13, 1953, some means may be provided for withdrawing the electrode back into the nozzle whenever a welding operation ceases. This operation effectively eliminates the possibility of an energized electrode, accidentally touching the workpiece during the flux pick-up operation.

Release of the switch 74 again operates to open the butterfly valve 71, thus causing the flow of air inwardly through the flux-discharge opening 21 to again commence, and preventing any further flow of flux outwardly therethrough. After the flow of air inwardly has commenced, the welding operator can then move the welding head back along the weld seam, thus picking up the loose, unused flux 23 remaining over the seam, all of this substantially as shown in Figure 4. To facilitate this operation, oftentimes the welding head A is laid down on its side.

Figure 6:
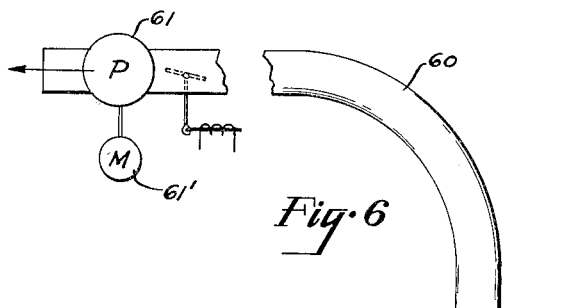
Figure 6 is a side elevational view partly in section and somewhat schematic of apparatus embodying the essential features of the invention.

Referring now to Figure 6, apparatus is there shown wherein the invention is employed solely for the purpose of filling the flux hopper or for controlling the flow of flux out of the flux hopper onto a seam to be welded. In this embodiment of the invention, a flux hopper 20' is shown as having generally the same dimensions in relative proportions to the flux hopper of Figures 1 and 2 and as having a rigid member 33' at the lower end thereof which has a restricted cross-sectional area at the lower end to form a flux discharge or flux intake nozzle. This flux hopper 20' is connected to a vacuum pump 61 driven by an electric motor 61' as was described with relation to the embodiment shown in Figures 1 and 2. The vacuum pump 61 is again located remotely from the flux hopper 20' but, as will be appreciated, the spacing of the pump 61 from the flux hopper 20' is a matter of design and, obviously, the pump 61 could be combined with the flux hopper 20', particularly where portability of the flux hopper is not a prime necessity. The pump 61, in the embodiment shown in Figures 6, is connected to the flux hopper 20' through a hose 60 similar to that described in the preferred embodiment. Also, means for preventing the passage of flux particles from the flux hopper through the hose 60 to the vacuum pump 61 are provided in the form of means indicated generally at 65' for reducing the velocity of the air at a point between the flux hopper 20' and the pump 61 to the point that the air velocity can no longer carry the flux particles upwardly and, therefore, the flux particles can fall back into the flux hopper where, generally, so long as the vacuum pump 61 is operating, the particles will remain in a constant state of agitation. It will be appreciated, however, that in some instances the portions of the flux will remain in this constant state of agitation while other portions of the flux may settle down into a relatively undisturbed state. Normally, when this occurs, such particles will be along the sides of the flux hopper while the center or core of the flux remains in a state of agitation. Any flux which would tend to fall from the relatively quiet flux particles into the flux-discharge opening would, of course, immediately be picked up by the air stream and carried back into the flux hopper. Obviously, the flux hopper 20' may be employed as an auxiliary flux-holding tank adapted to feed flux into other flux hoppers whenever the butterfly valve 71 is closed to stop the flow of air through the flux-discharge opening or the hopper 20' may be employed in conjunction with other forms of welding electrodes which are well known in the art other than those shown in Figures 1 and 2.

In some instances, it will be appreciated that the diameter or cross-sectional area of the flux hopper 20' may be increased to such a point that the air velocity at the upper parts of the hopper will be insufficient to carry the flux particles back to the vacuum pump 61; in which case, the means 65' may, of course, be eliminated. Normally, such a change would only be used when the flux hopper did not have to be portable or semi-portable. Such an arrangement is shown in Figure 7.

Figure 7:
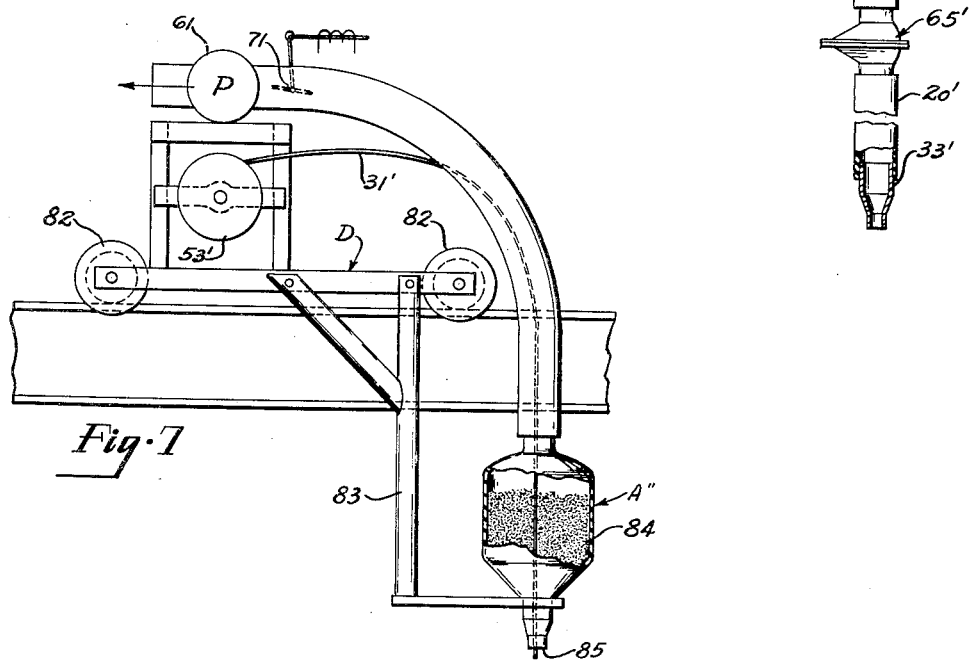
Figure 7 is a side elevational view somewhat schematic of automatic welding apparatus embodying the present invention.
Figure 8:
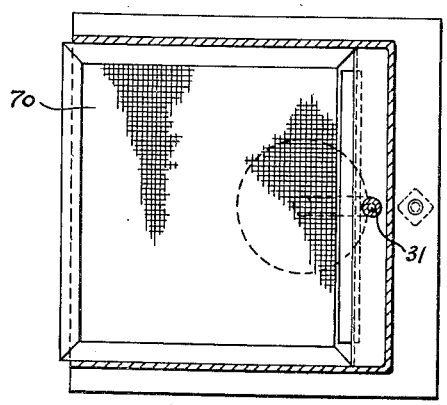
Figure 8 is a sectional view of Figure 2 taken on the line 8—8 thereof.

Referring now to Figure 7, there is shown what is normally termed as fully automatic welding apparatus wherein a carriage indicated generally at D is supported for movement along a horizontal track or over-head support by means of wheels 82 or the like. The apparatus includes a downwardly-extending frame 83 which, in turn, supports a flux hopper 84 having a flux-discharge opening 85 at the lower end thereof. A welding electrode 31' is fed from a reel 53' mounted on the upper part of the carriage D and fed as is generally conventional by means of drive rolls not shown to the welding head A" and outwardly through the flux-discharge opening 85, the vacuum pump 61, in turn, communicating through a long flexible hose with the upper part of the flux hopper 84. Means for controlling the application of the vacuum with the pump 61 in the form of the butterfly valve of the preferred embodiment are also shown in Figure 7. Here, as in the preferred embodiments, when the butterfly valve 71 is opened, a flow of air is set up inwardly of the discharge opening 85, which air is sufficient to suck or carry with it any flux which might be in the opening 85 into the flux hopper 84. In the embodiment shown in Figure 7, however, the flux hopper 84 has a very substantial diameter sufficient to carry a substantially greater amount of flux than that shown in the flux hopper shown in Figures 1 and 2, this being possible because the problem of portability does not exist. In fact, the diameter of the flux hopper 84 may be sufficiently large that the means 65' of Figure 6 are not necessary. Thus, as the flux is drawn inwardly through the discharge opening 85, it will tend to quickly settle onto the lower walls of the hopper 84 which tends to restrict the passage through which the air must pass upwardly to the pump 61. However, because of the velocity of the air flowing, flux will continuously be picked up and carried higher and higher into the hopper 84, the new flux coming in tending to restrict the area of the passage progressively upwardly through the hopper so that new flux will continuously be carried to the top of the pile of flux within the hopper. Obviously, if the flux should completely fill the hopper 84, it would then be carried directly over to the pump 61 which would be considered undesirable. Automatic means may be provided to close the valve 71 whenever this undesirable event should commence to happen.

Obviously, the flux hopper 84 could be made with a diameter similar to the diameter of the flux hopper of Figures 1 and 2 whereby the means 65 for decreasing the velocity of the air at one point between the flux-discharge opening 85 and the pump 61 to a point below that at which the air is capable of carrying the flux is provided.

The invention has been described only in connection with preferred embodiments thereof. Obviously, the invention may take physical embodiment in other constructions differing radically in appearance from those described and illustrated in this specification, which modifications will occur to others upon a reading and understanding of this specification. It is our intention to include all such modifications insofar as they come within the scope of the appended claim.

We claim:

Electric arc welding apparatus of the type adapted to simultaneously deposit a pile of granular welding flux on a proposed weld bead and to deposit molten metal on such weld bead, comprising in combination an elongated generally vertically extending flux hopper of a predetermined cross-sectional size, a flux discharge passage at the lower end of said hopper having a cross-sectional area less than that of the hopper, an electrode discharge nozzle disposed in said passage, means for feeding an electrically energized electrode generally coaxially through said nozzle toward a workpiece, a vacuum source connected to said hopper at a point remote from said passage and adapted to cause a flow of air inwardly through said passage to either pick up welding flux or prevent welding flux in said hopper from falling out of said passage, and means for controlling said vacuum source in relation to said hopper whereby when it is desired to effect a weld, flux may be discharged through the flux passage on to the workpiece simultaneously with the feeding of an electrode towards the workpiece.

References Cited in the file of this patent

UNITED STATES PATENTS

| | | |
|---|---|---|
| 1,280,780 | Lob | Oct. 8, 1918 |
| 2,269,538 | Lewhers | Jan. 13, 1942 |
| 2,390,560 | Stanley et al. | Dec. 11, 1945 |
| 2,402,937 | Stringham | June 25, 1946 |
| 2,445,863 | Sarajin | July 27, 1948 |
| 2,478,525 | Cutrer | Aug. 9, 1949 |
| 2,510,204 | Baird | June 6, 1950 |